United States Patent
Faruque et al.

(10) Patent No.: US 10,071,690 B2
(45) Date of Patent: Sep. 11, 2018

(54) EXPANDABLE TOP FOR VEHICLE CENTER CONSOLE

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/392,184

(22) Filed: Dec. 28, 2016

(65) Prior Publication Data

US 2018/0178733 A1    Jun. 28, 2018

(51) Int. Cl.
*B60R 7/00* (2006.01)
*B60R 7/04* (2006.01)

(52) U.S. Cl.
CPC ..................... *B60R 7/04* (2013.01)

(58) Field of Classification Search
CPC ..................................................... B60R 7/04
See application file for complete search history.

(56) References Cited

U.S. PATENT DOCUMENTS

| | | | |
|---|---|---|---|
| D437,714 S * | 2/2001 | Rasche | D6/686 |
| 8,196,985 B2 | 6/2012 | Penner et al. | |
| 8,919,847 B2 | 12/2014 | Mather et al. | |
| 8,925,989 B2 | 1/2015 | Appelboum et al. | |
| 9,713,972 B2 * | 7/2017 | Bozio | B60N 2/4686 |
| 2002/0134698 A1 * | 9/2002 | Rhodes | B65D 5/542 206/477 |
| 2011/0068598 A1 | 3/2011 | Penner | |
| 2011/0121596 A1 | 5/2011 | Beyer | |

FOREIGN PATENT DOCUMENTS

FR          3007341 A1     6/2003

* cited by examiner

*Primary Examiner* — Lori L Lyjak
(74) *Attorney, Agent, or Firm* — Vichit Chea; Brooks Kushman P.C.

(57) ABSTRACT

A vehicle center console includes an expandable top disposed on a storage bin. The center console is slidably connected to a floor pan and is movable towards the second-row seats. The expandable top includes a central component having an upper side and an underside, and a telescoping mechanism attached to first and second movable side components. The telescoping mechanism includes a body connected to the underside and a pair of telescoping arms extending from opposing sides of the body and movable between at least an extended position and a collapsed position. Each of the side components are attached to one of the arms such that undersides of the side components overlap the upper side of the central component when the arms are in the collapsed position, and the upper side of the central component is substantially flush with upper sides of the side components when the arms are in the extended position.

20 Claims, 5 Drawing Sheets

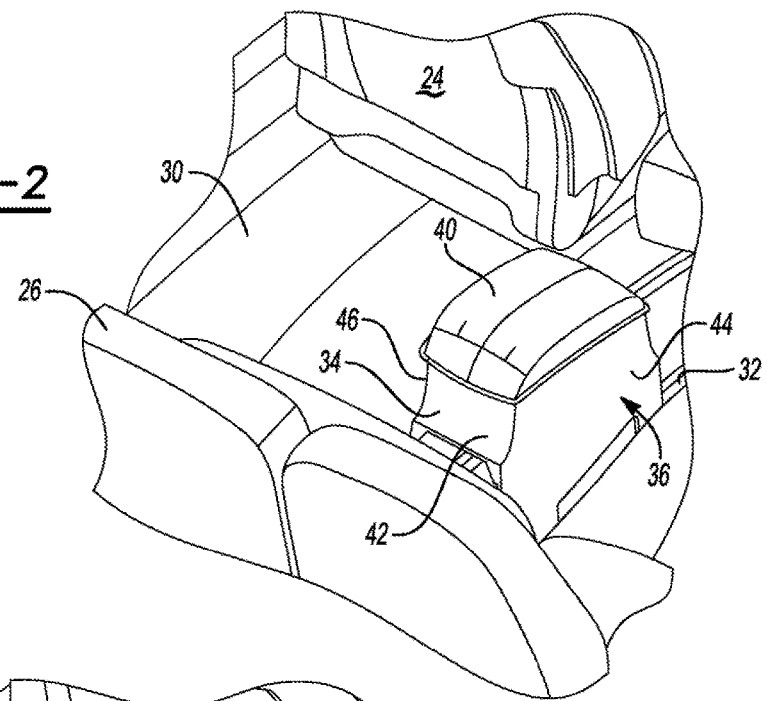
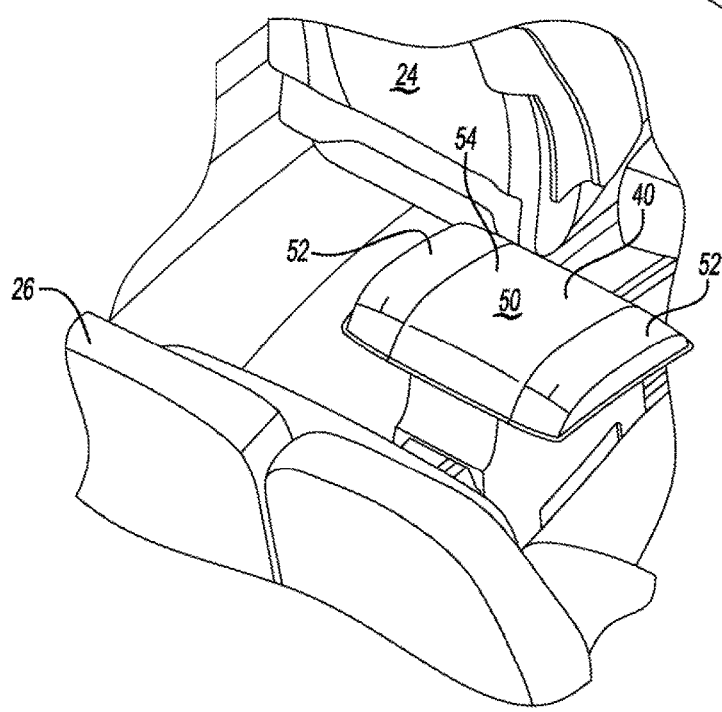

EXPANDABLE TOP FOR VEHICLE CENTER CONSOLE

TECHNICAL FIELD

The present disclosure relates to center consoles for vehicles and specifically to center consoles that are expandable.

BACKGROUND

Many motor vehicles include a center console disposed between front seats of the vehicle. Many center consoles include a storage bin with a pivotable top that forms a lid of the storage bin. The top is typically padded and forms an arm rest for the front seats when in the closed position.

SUMMARY

According to one embodiment, a center console includes an expandable top having a central component and first and second movable side components slidably connected to the central component such that, in a collapsed configuration, the side components substantially overlap the central component with the side components adjacent each other forming a narrower top, and, in an expanded configuration, the side components are spaced apart forming a wider top.

According to another embodiment, a center console of a vehicle includes an expandable top having a central component and pair of side members slidably attached to the component between a collapsed configuration in which the members overlap the component and abut each other forming a narrower top surface of the center console that is above the component, and an expanded configuration where the component and the members are substantially flush forming a wider top surface of the center console.

According to yet another embodiment, an expandable top of a center console includes a central component having an upper side and an underside, and a telescoping mechanism. The telescoping mechanism attaches the central component to first and second movable side components. The telescoping mechanism includes a body connected to the underside and a pair of telescoping arms extending from opposing sides of the body and movable between at least an extended position and a collapsed position. Each of the side components are attached to one of the arms such that undersides of the side components overlap the upper side of the central component when the arms are in the collapsed position, and the upper side of the central component is substantially flush with upper sides of the side components when the arms are in the extended position.

BRIEF DESCRIPTION OF THE DRAWINGS

FIG. 2 is a diagrammatical perspective view of the passenger cabin showing the center console positioned in a rear seating area of the passenger cabin and in a collapsed configuration.

FIG. 3 is a diagrammatical perspective view of the passenger cabin showing the center console positioned in the rear seating area and in an expanded configuration.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
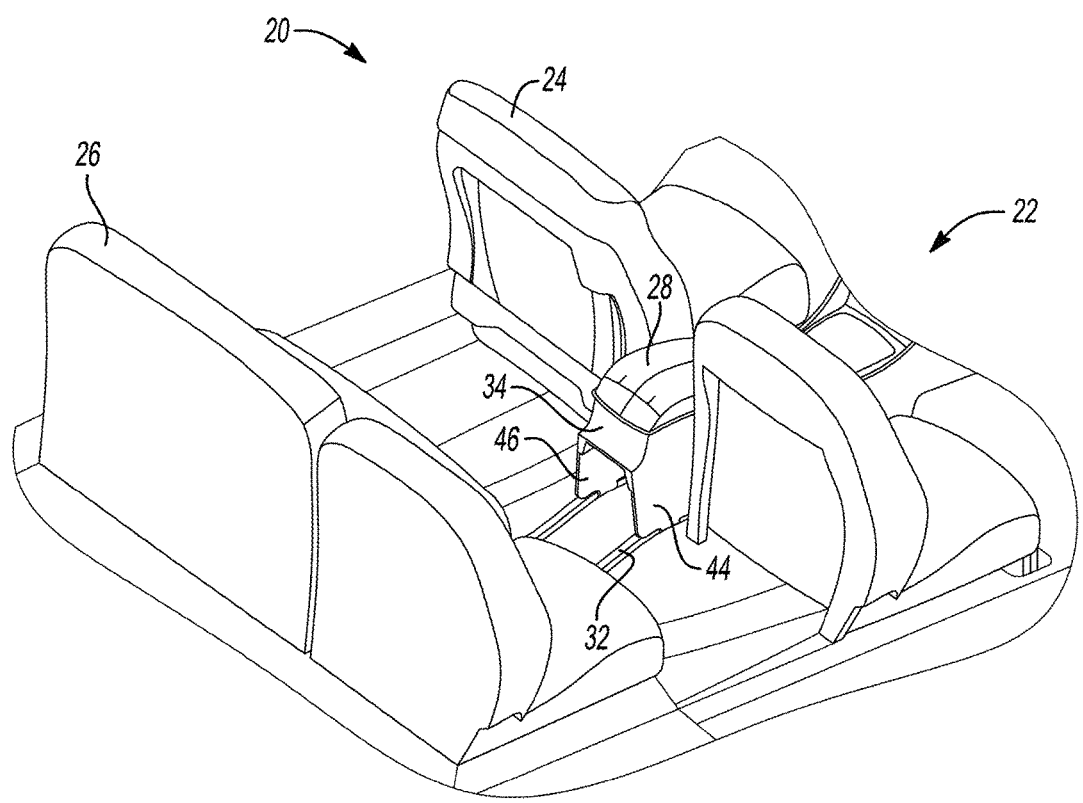
FIG. 1 is a diagrammatical perspective view of a passenger cabin of a vehicle with a center console positioned between front seats of the vehicle.

Referring to FIGS. 1 and 2, a vehicle 20 includes a passenger cabin 22 having a pair of front seats 24 and a row of rear seats 26 disposed behind the front seats 24. A center console 28 is disposed between the front seats 24. The center console 28 may provide a storage area as well as armrests for occupants of the front seats 24. The center console 28 is slidable towards the rear seat 26. Tracks 32 may be provided on the floor pan 30 to slide the center console 28 between at least a forward position in which the console 28 is between the front seats 24 and a rearward position in which the center console 28 is disposed in a rear seating area just in front of the rear seats 26.

The center console 28 may include a housing 34 having a plurality of sidewalls such as a front sidewall, a rear sidewall 42, a right sidewall 44, and a left sidewall 46. A storage bin 36 is defined within the housing 34. A top 40 is attached to the housing 34 and is movable to open and close the storage bin 36. In one or more embodiments, the top 40 is pivotally attached to the rear sidewall 42, by a hinge or other pivoting mechanism. A latch may be provided to secure the top 40 in the closed position. A lower portion of the sidewalls 44, 46 are connected to the tracks 32 to secure the center console 28 to the floor pan 30. Each track 32 may include a first guide member mounted to the floor pan 30 and a second guide member mounted to a corresponding one of the sidewalls 44, 46.

Referring to FIGS. 2 and 3, the center console 28 may be slid to the rearward position allowing a back-seat occupant to use the top 40 as a table surface. The top 40 may be used to support a laptop, documents, or other items. The top 40 may be expandable to increase utility as a table surface. For example, the top 40 may be expanded in the lateral direction to increase the width of the top 40. FIG. 2 illustrates the top 40 in the collapsed configuration, and FIG. 3 illustrates the top 40 in the expanded configuration.

The top 40 may include a central component 50 and a pair of movable side members 52 that are each disposed on opposing lateral portions of the central component 50. Each of the side members 52 are slidably attached to the central component allowing the side members to be slid towards the centerline of the central component 50 to collapse the top 40 and to be slid towards the lateral sides of the central component 50 to expand the top 40. The side members 52 may overlap with the central component 50 when the top 40 is at least partially collapsed, and may be substantially co-planar when in the expanded configuration to provide a flat table surface 54. The side members 52 may slide over the central component 50 as illustrated, or may slide under the central component 50.

Figure 4:
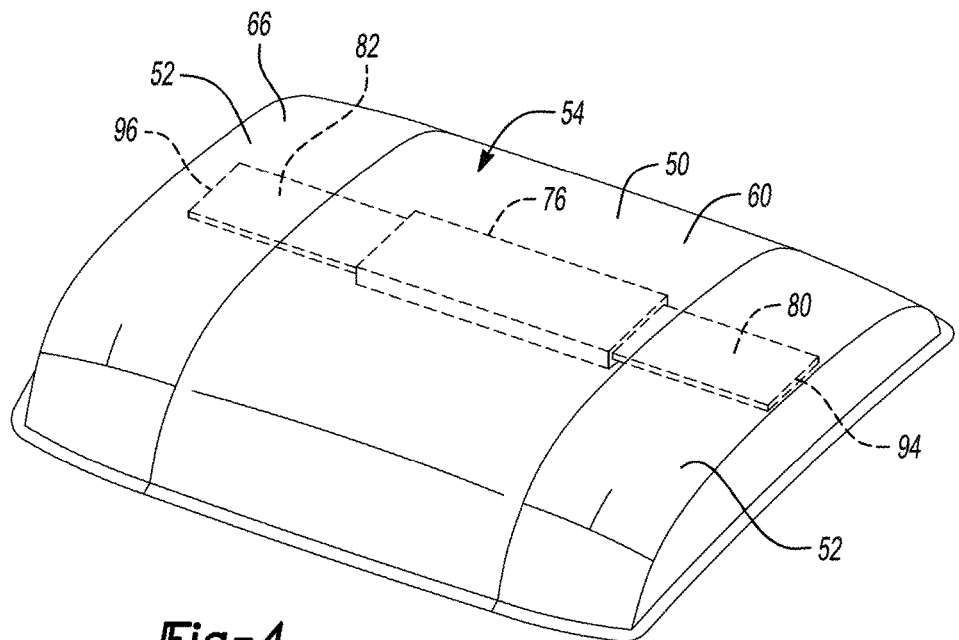
FIG. 4 is a perspective view of a top of the center console in the expanded configuration.
Figure 5:
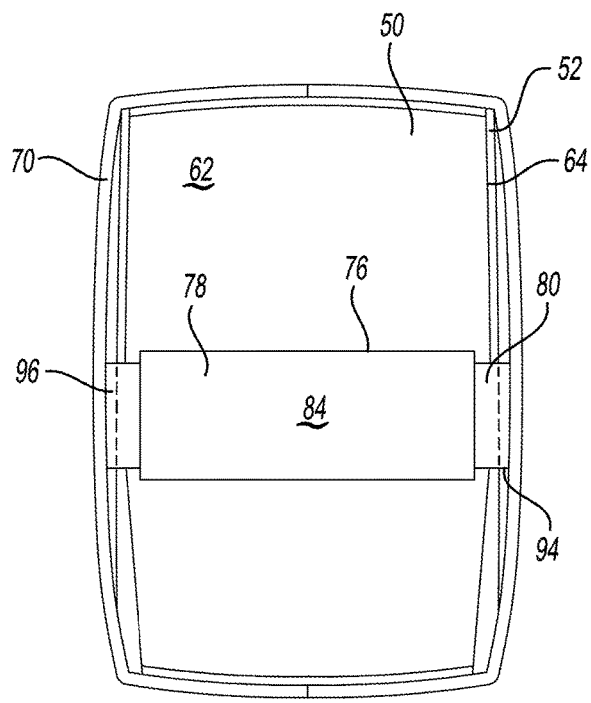
FIG. 5 is a bottom view of the top in the collapsed configuration.
Figure 6:
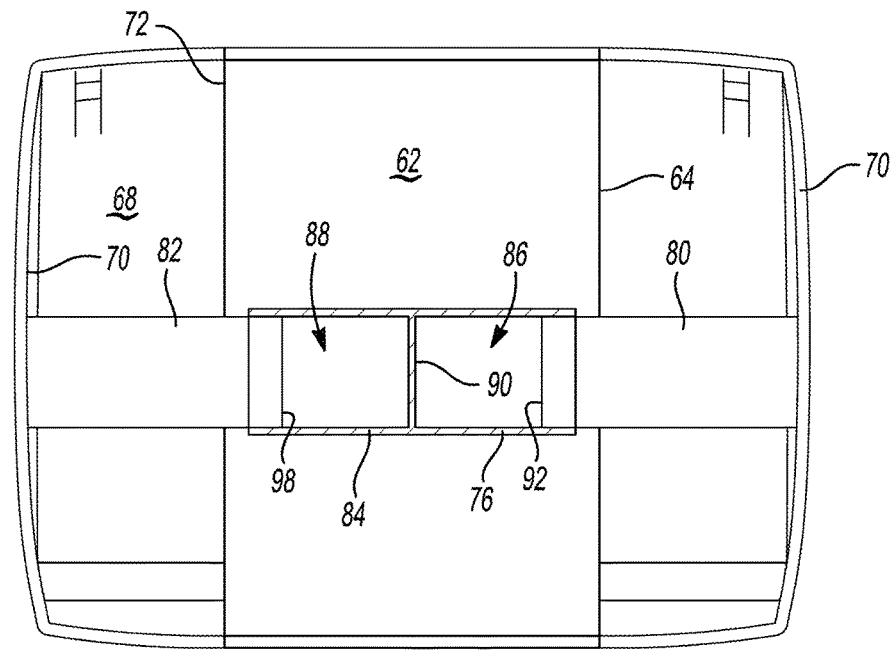
FIG. 6 is a bottom view of the top in the expanded configuration.

Referring to FIGS. 4, 5, and 6, the central component 50 may include an upper side 60 that forms a portion of the table surface 54 when the top 40 is expanded and an underside 62 that is opposite the upper side 60. Lateral sides 64 of the central component 50 extend between the upper side 60 and the underside 62. Each of the side members 52 may include an upper side 66 that forms a portion of the table surface 54 and an underside 68. Each of the side members 52 may also include an outer sidewall 70 that extends downwardly from the underside 68, and each of the side members 52 may include an inner side 72 that is opposite the outer sidewall 70. The inner sides 72 face each other and are abutting when the top 40 is in the collapsed configuration. Each inner side 72 may abut one of the lateral sides 64 of the central component 50 when in the expanded configuration. The upper side 60 may be substantially flush with the upper sides 66 when in the expanded configuration to provide a substantially flat table surface 54.

The central component 50 is connected to the side members 52 by a guide mechanism such as telescoping mechanism 76. The telescoping mechanism 76 guides the side members 52 relative to the central component 50. The telescoping mechanism 76 may include a guide member 78 connected to the underside 62, a first arm 80 connected to one of the side members 52, and a second arm 82 connected to the other of the side members 52. The arms 80, 82 may telescopically slide relative to the guide member 78 to move the side members 52 between the collapsed and the expanded configurations.

In one or more embodiments, the guide member 78 may include a tubular body 84 that defines a first sleeve 86 and a second sleeve 88 that oppose each other and are axially aligned. A divider 90 separates the first sleeve 86 and the second sleeve 88. The first sleeve 86 receives the first arm 80, and the second sleeve 88 receives the second arm 82. The sleeves and the arms are configured so that each of the arms may reciprocally slide within their respective sleeve to move the side members 52 between the expanded configuration and the collapsed configuration. In the illustrated embodiment, the sleeves and arms have a rectangular cross section, but in other embodiments, they may have a circular, ovular or any other suitable cross-section. In other embodiments, the first and second arms 80, 82 may each define a sleeve that slidably receives a projection of the guide member 78.

The first arm 80 may include a distal end 94 connected to one of the outer sidewalls 70 and a proximal end 92 disposed within the sleeve 86. The second arm 82 may include a distal end 96 connected to the other of the sidewalls 70 and a proximal end 98 disposed within the second sleeve 88. In other embodiments, the arms may connect to the underside 68 of the side members.

Figure 7:
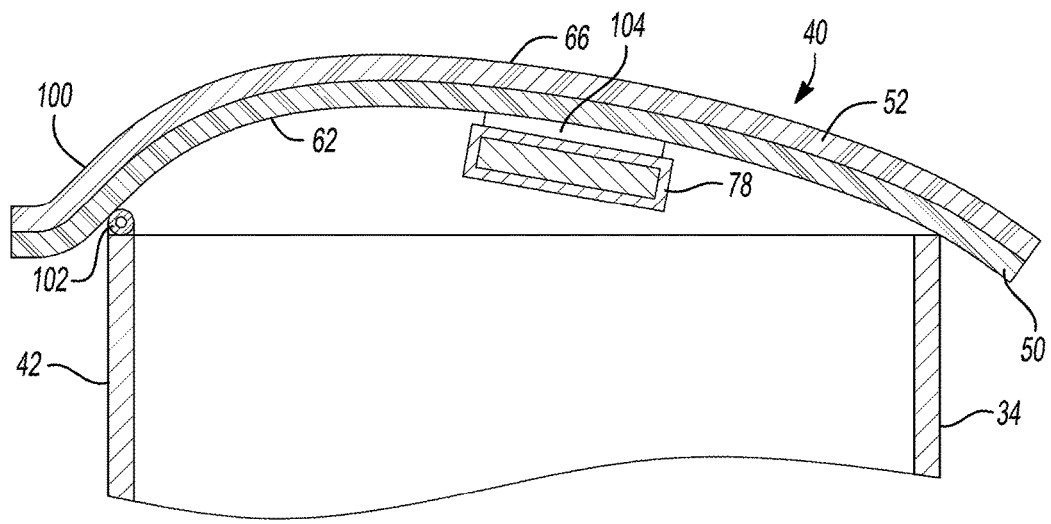
FIG. 7 is a side view, in cross section, of the center console in the collapsed configuration.
Figure 8:
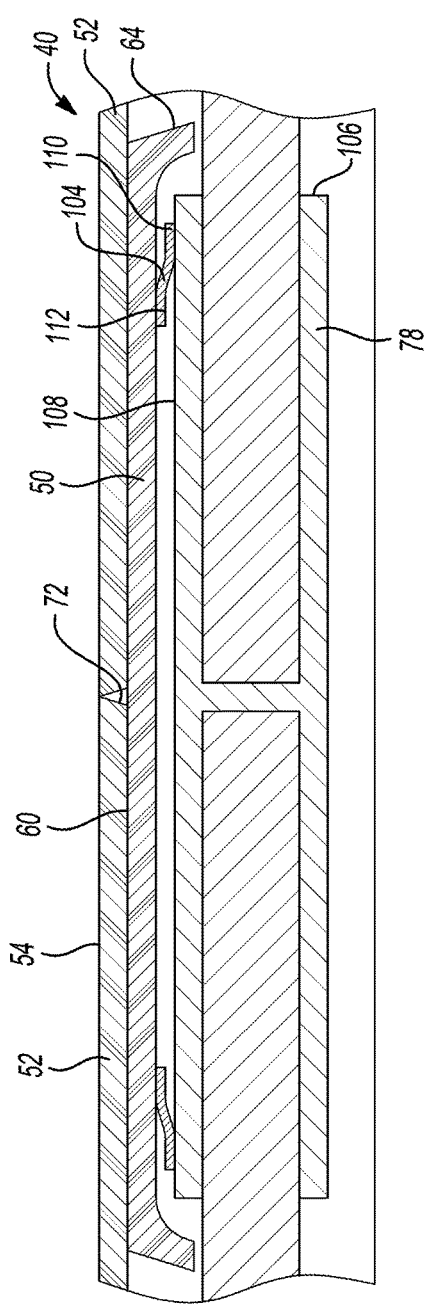
FIG. 8 is a back view, in cross section, of the top in the collapsed configuration.
Figure 9:
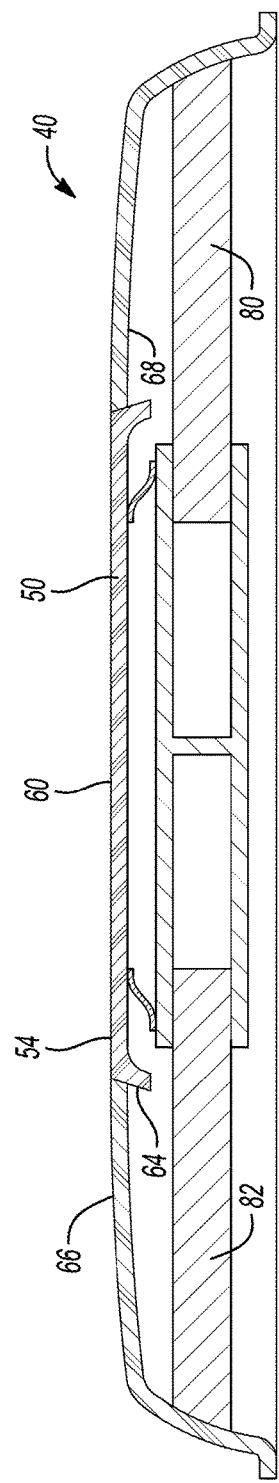
FIG. 9 is a back view, in cross section, of the top in the expanded configuration.

Referring to FIGS. 7, 8, and 9, a rear portion 100 of the top 40 may be connected to the rear sidewall 42 by a hinge 102. For example, the hinge 102 may include a first component attached to an upper region of the rear sidewall 42 and a second component attached to the underside 62 of the central component 50. The guide member 78 may be connected to the underside 62 by a connector. The connector may be a resilient member or a rigid member. In the illustrated embodiment, the guide member 78 is connected to the underside 62 by a pair of resilient members 104. The resilient members may be a leaf spring, a coil spring, or other biasing mechanism. The resilient members 104 are illustrated as leaf springs and may be formed of plastic or metal. The springs 104 may be connected to the guide member 78 and the central component 50 by fasteners, adhesive, welding, chemical bonding, or other means known in the art. The resilient members 104 bias the central component 50 and the guide member 78 away from each other in the vertical direction. Each of the resilient members 104 may include a lower end 110 attached to a top surface 108 of the guide member 78 near a corresponding sidewall 106 and an upper end 112 attached to the underside 62.

In the illustrated embodiment, the underside 68 of the side members 52 overlap the upper side 60 of the central component 50 when in the collapsed configuration so that the upper sides 66 of the side members cooperate to form the entire table surface 54. To expand the top 40, the side members 52 are slid away from each other towards the sides 64 of the central component 50. When the gap between the inner sides 72 approximates the width of the central component 50, the resilient members 104 force the central component 50 upwardly towards the side members 52 to span the gap. When fully expanded, each of the sides 64 are adjacent to one of the sides 72 and the central component 50 and the side members 52 cooperate to form an enlarged table surface 54. The sides 64 may engage with the sides 72 to create a substantially seamless table surface 54.

The sides 64 and the sides 72 may have specific geometric configurations or features to reduce the seams between the side members 52 and the central component 50 and to aid in deployment and retraction of the central component 50. The sides 64 and the sides 72 may be inclined at cooperating angles to collapse the central component 50 towards the guide member 78 when the side members 52 are pushed towards a longitudinal centerline of the central component 50. For example, the sides 64 are angled at an obtuse angle relative to the upper side 60, and the inner sides 72 are angled at an acute angle relative a corresponding one of the upper sides 66.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A center console comprising:
an expandable top including:
a central component, and
first and second movable side components slidably connected to the central component such that, in a collapsed configuration, the side components substantially overlap the central component with the side components adjacent each other forming a narrower top, and, in an expanded configuration, the side components are spaced apart forming a wider top.

2. The center console of claim 1, wherein the first and second side components are touching when in the collapsed configuration.

3. The center console of claim 1, wherein an upper side of the central component is substantially flush with upper sides of the side components when in the expanded configuration.

4. The center console of claim 1, wherein the central component has a pair of opposing lateral sidewalls, and each of the side components has an inner sidewall that faces one of the lateral sidewalls of the central component when in the expanded configuration.

5. The center console of claim 4, wherein each of the pair of lateral sidewalls engages one of the inner sidewalls when in the expanded configuration.

6. The center console of claim 4, wherein the pair of lateral sidewalls are angled relative to an upper surface of the central component, and each of the inner sidewalls are angled relative an upper surface of a corresponding one of the side components.

7. The center console of claim 6, wherein the pair of opposing sidewalls are angled at an obtuse angle, and the inner sidewalls are angled at an acute angle.

8. The center console of claim 1, wherein the expandable top further includes a telescoping mechanism having a first guide member connected to an underside of the central component and a pair of second guide members each connected to one of the side components, wherein the second guide members slide relative to the first guide member to move the top between the expanded configuration and the collapsed configuration.

9. The center console of claim 8, wherein the first guide member further has a tubular body defining a pair of opposing sleeves that each slidably receive one of the second guide members therein.

10. The center console of claim 8, wherein the expandable top further includes at least one resilient member connecting the first guide member to the underside and biasing the first guide member away from the central component.

11. The center console of claim 10, wherein the at least one resilient member is a pair of leaf springs.

12. A center console of a vehicle comprising:
an expandable top including a central component and pair of side members slidably attached to the central component between a collapsed configuration in which the members overlap the central component and abut each other forming a narrower top surface of the center console that is above the central component, and an expanded configuration where the central component and the side members are substantially flush forming a wider top surface of the center console.

13. The center console of claim 12, wherein the expandable top further includes a telescoping mechanism having a guide member connected to an underside of the central component and a pair of arms each connected to one of the side members, wherein the guide member and the arms slide relative to each other to switch the top between the expanded configuration and the collapsed configuration.

14. The center console of claim 13, wherein the expandable top further includes at least one resilient member connecting the guide member to the underside and biasing the guide member away from the central component.

15. The center console of claim 12 further comprising a housing defining a storage bin, wherein the expandable top is connected to an upper portion of the housing and is movable relative to the housing to open and close the storage bin.

16. The center console of claim 15 further comprising a track having a first portion disposed on a floor pan of the vehicle and a second portion attached to a bottom of the housing, wherein the center console is movable via the track between a forward position in which the center console is disposed between a pair of front seats of the vehicle and a rear position in which the center console is adjacent to a rear seat of the vehicle.

17. The center console of claim 12, wherein the central component has opposing lateral sides that are angled at an obtuse angle relative to an upper side of the central component.

18. An expandable top of a center console comprising:
a central component having an upper side and an underside;
a telescoping mechanism including a body connected to the underside and a pair of telescoping arms extending from opposing sides of the body and movable between at least an extended position and a collapsed position; and
first and second movable side components each having an upper side and an underside, each of the side components being attached to one of the telescoping arms such that undersides of the side components overlap the upper side of the central component when the telescoping arms are in the collapsed position, and the upper side of the central component is substantially flush with the upper sides of the side components when the telescoping arms are in the extended position.

19. The expandable top of claim 18, wherein the central component has lateral sides that engage with inner sides of the side components when the telescoping mechanism is in the extended position.

20. The expandable top of claim 18, wherein the central component has lateral sides that are angled at an obtuse angle relative to the upper side of the central component, and each of the side components has an inner sidewall angled at an acute angle relative to the upper side of the side component.

* * * * *